Jan. 12, 1937.    I. E. WEBER ET AL    2,067,364
MANUFACTURE OF HYDROGEN PEROXIDE
Filed Sept. 29, 1932
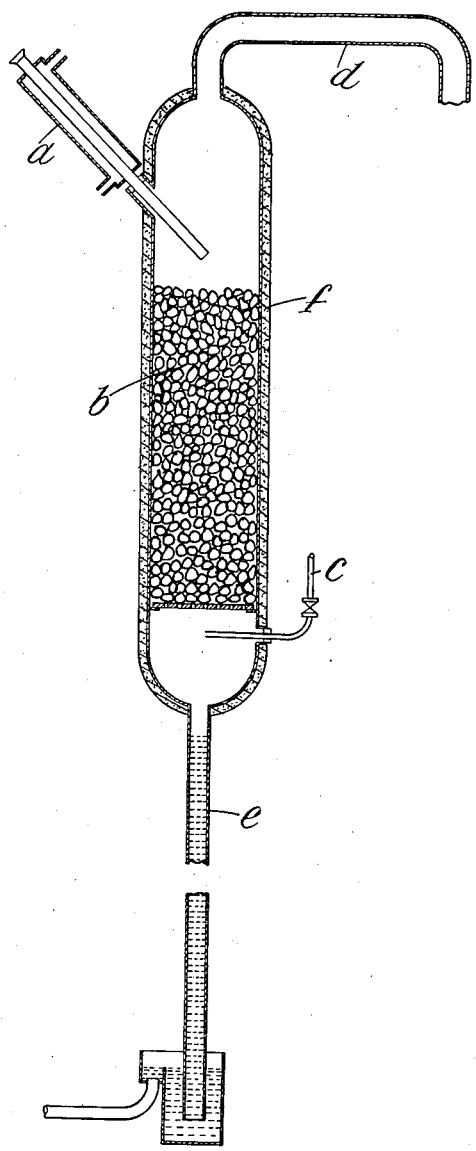
INVENTORS
Isaac E. Weber
Victor W. Slater
By 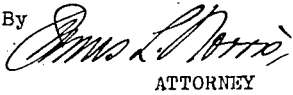
ATTORNEY Patented Jan. 12, 1937

2,067,364

UNITED STATES PATENT OFFICE 2,067,364

MANUFACTURE OF HYDROGEN PEROXIDE

Isaac Ephraim Weber and Victor Wallace Slater, Luton, England, assignors, by mesne assignments, to E. I. du Pont de Nemours & Company, Wilmington, Del., a corporation of Delaware Application September 29, 1932, Serial No. 635,446
In Great Britain October 14, 1931

3 Claims. (Cl. 202—73)

Hydrogen peroxide is generally produced from a solution of persulphuric acid or a persulphate by conducting the solution through a long narrow tube, or tubes. The tubes are heated externally by steam, the conditions being such that hydrolysis of the solution and vapourization of the hydrogen peroxide so formed is complete by the time the solution has traversed the tubes.

A defect in this process and in other processes in which the hydrolysis is practically completed during concentration is that in order to obtain maximum hydrolysis of the persulphate and distillation of the hydrogen peroxide the concentration has to be carried so far that decomposition of hydrogen peroxide becomes an important loss.

This invention is based on the observation that an enhanced yield of hydrogen peroxide is obtained if the degree to which the electrolized solution is concentrated is considerably smaller than has been hitherto the practice, and the main hydrolysis is produced in a still which has the form of a column containing scrubbing material, such as Raschig rings or perforated plates or bubblers and wherein steam distillation of the hydrogen peroxide occurs under diminished pressure.

According to the invention the concentration under diminished pressure is discontinued when not more than half the persulphate or persulphuric acid has been hydrolyzed, whereupon the liquid enters a still under diminished pressure in which the hydrolysis is completed in the presence of steam and this together with the hydrogen peroxide passes away to a rectifying column or a condenser.

The preferred still has the form of a column of scrubbing material, such as Raschig rings. When the arrangement is such that the vapours from the concentrating plant are delivered into the column together with the concentrated liquid, the steam thus introduced into the column and passing upwards or downwards among the Raschig rings or the like together with the liquid, determines the hydrolysis and carries forward the vapour of hydrogen peroxide. However, it is more generally convenient to admit steam into the column.

When tubes are used as referred to above, they are preferably comparatively wide and are heated externally by steam, the conditions being such that little occurs in them save the formation of steam.

The arrangement may be such that the tubes discharge the vapour and liquid from the tube, or tubes, into the top of the column and pass down the latter with or without additional steam, which may be excess steam from the steam jacket that heats the tube. Steam and hydrogen peroxide leave the column at an opening in its lower part connected with the condenser and vacuum pump, while the liquid leaves at a second opening through a suitably long sealed tube.

An alternative arrangement consists in admitting, as before, the vapours and liquid at the top of the column and causing steam to ascend the column; hydrolysis of the liquid occurs and the steam distils the hydrogen peroxide, while the liquid leaves the bottom of the column through a suitably long sealed tube. The hydrogen peroxide distilled by the steam ascends the column and with the vapours from the tubes passes to the condenser through an opening at the upper part of the column.

In either arrangement there may be a rectifying column inserted between the vapour outlet of the column and the condenser, if a concentrated hydrogen peroxide is required.

The invention is well adapted for use in a plant for continuously circulating the solution of sulphuric acid or bisulphate (particularly ammonium bisulphate) through an electrolytic cell and the still, fresh acid or bisulphate being introduced into the circulation as may be necessary. It is found that an electrolytic cell consisting of a single chamber gives good results thus avoiding the use of anolyte and catholyte chambers with separating diaphragms.

The accompanying diagram represents a vertical section through a column still of the kind indicated above. $a$ is a battery of steam jacketed vacuum tubes into which the persulphate solution is fed by a feeding device, for instance as described in specification No. 358,654, and is evaporated.

The concentrated solution leaves tube $a$ and flows down column $b$ which is filled with Raschig rings or other suitable scrubbing material and has a jacket $f$ of heat insulating material. Steam is introduced at $c$ and passes up the column and with hydrogen peroxide vapour leaves by tube $d$ to enter a condenser or rectifying column, not shown. The bisulphate residue leaves the bottom of the hydrolysis column $b$ by means of a sealed barometric column $e$.

The whole of the apparatus is under reduced pressure.

As an example of the invention may be considered a solution containing ammonium persulphate, ammonium bisulphate and sulphuric acid of the following composition:—

| | Grams |
|---|---|
| Ammonium persulphate per litre | 200 |
| Ammonium bisulphate per litre | 172 |
| Sulphuric acid per litre | 135 |

This solution is fed into the steam heated tubes, which are under a reduced pressure of approximately 1½ inches of mercury, by means of a feeding device at the rate of 9.7 gallons an hour. The evaporation of this solution is so controlled as to give a concentrate leaving the tubes at the rate of 3.65 gallons an hour and this passes to the hydrolysis column. The water and hydrogen peroxide vapour of a weight of 64.6 lbs. per hour goes to the condenser or rectifying column. The hydrogen peroxide obtained by hydrolysis at this stage is kept at a minimum by the controlled evaporation and does not as a rule exceed 20 per cent. of that available from the ammonium persulphate.

In order to hydrolyze the concentrate it is passed down the hydrolysis column which is at a temperature of 70–80° C. and under a reduced pressure of approximately 1½ inches of mercury. The hydrolyzing column is filled with Raschig rings or other suitable scrubbing material and steam is passed up the column at the rate of approximately 68 lbs. an hour so that the hydrogen peroxide in the concentrate is removed immediately it is formed in order to prevent its decomposition. This hydrogen peroxide vapour passes to the condenser or rectifying column by the same outlet as the vapour from the evaporating tubes. The yield of hydrogen peroxide obtained is 97 per cent. of the theoretical. The bisulphate solution produced by the hydrolysis leaves the bottom of the hydrolyzing column by means of a suitably long barometric seal, is diluted with water, purified if necessary and proceeds to the electrolyzing vessels.

The invention is not limited to the above example as it is possible to vary the ratio of persulphate, bisulphate and sulphuric acid within wide limits provided such solution remains liquid in the hydrolyzing column.

Having thus described the nature of the said invention and the best means we know of carrying the same into practical effect, we claim:—

1. A process for producing hydrogen peroxide from a solution of persulphuric acid or a persulphate comprising the steps of first concentrating and hydrolyzing and then distilling said solution, wherein the concentration is discontinued when not more than half the persulphate or persulphuric acid has been hydrolyzed and the hydrolysis is completed, substantially without further evaporation of water, by steam distillation.

2. A process for producing hydrogen peroxide from a solution of persulphuric acid or a persulphate comprising the steps of first concentrating and hydrolyzing and then distilling said solution, wherein the concentration is discontinued when not more than half the persulphate or persulphuric acid has been hydrolyzed and the hydrolysis is completed by steam distillation and substantially without further evaporation of water, in a column still under reduced pressure.

3. A process for producing hydrogen peroxide from a solution of persulfuric acid or a persulfate by first concentrating and hydrolyzing said solution and then distilling said solution, said step of concentration being discontinued when not more than one-half the persulfate or persulfuric acid has been hydrolyzed, which comprises the steps of feeding the solution into steam heated tubes at a pressure of approximately 1½" of mercury, the temperature being such that approximately one-half of said solution evaporates, conveying the concentrated solution resulting and the vapors into the upper part of a column still maintained at a temperature of 70 to 80° C., the pressure being approximately 1½" of mercury, introducing steam at the bottom of the column still, said steam emerging at the top thereof and carrying with it vapors of hydrogen peroxide and condensing said vapors in order to obtain a solution of said desired compound.

ISAAC EPHRAIM WEBER.
VICTOR WALLACE SLATER.